United States Patent
Kiyota

(10) Patent No.: US 8,549,232 B2
(45) Date of Patent: Oct. 1, 2013

(54) INFORMATION PROCESSING DEVICE AND CACHE MEMORY CONTROL DEVICE

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 12/964,199

(22) Filed: Dec. 9, 2010

(65) Prior Publication Data
US 2011/0161594 A1    Jun. 30, 2011

(30) Foreign Application Priority Data
Dec. 25, 2009  (JP) .................................. 2009-294549

(51) Int. Cl.
*G06F 12/00* (2006.01)
(52) U.S. Cl.
USPC ......................................................... 711/141
(58) Field of Classification Search
None
See application file for complete search history.

(56) References Cited

U.S. PATENT DOCUMENTS

| 2005/0210204 A1 | 9/2005 | Yamazaki |
| 2009/0106499 A1* | 4/2009 | Aoki et al. ..................... 711/137 |
| 2012/0102271 A1* | 4/2012 | Kanoh .......................... 711/133 |

FOREIGN PATENT DOCUMENTS

| JP | 2004-5710 | 1/2004 |
| JP | 4180569 | 11/2008 |

* cited by examiner

*Primary Examiner* — Brian Peugh
(74) *Attorney, Agent, or Firm* — Staas & Halsey LLP

(57) ABSTRACT

An information processor includes processing units each processes an out-of-order memory access and includes a cache memory, an instruction port that holds instructions for accessing data in the cache memory, a first determinator that validates a first flag when a request for invalidating cache data is received after a target data of a load instruction is transferred from the cache memory and a load instruction having a cache index identical to that of a target address of the received invalidating instruction exists, a second determinator that validates a second flag when the target data of the load instruction in the instruction port is transferred after a cache miss of the target data occurred, and a re-execution determinator that instructs to re-execute an instruction that follows the load instruction if the first and the second flags are valid when a load instruction in the instruction port has been completed.

7 Claims, 17 Drawing Sheets

FIG. 7

| VALID | STATUS | OPCODE | ADDRESS | RIM | RIF |

INFORMATION PROCESSING DEVICE AND CACHE MEMORY CONTROL DEVICE

CROSS-REFERENCE TO RELATED APPLICATION

This application is based upon and claims the benefit of priority of the prior Japanese Application No. 2009-294549, filed on Dec. 25, 2009, the entire contents of which are incorporated herein by reference.

FIELD

Embodiments of the invention relate to an information processing device and a cache memory control device. The invention is applicable to, for example, a processing unit that processes memory access in an out-of-order manner.

BACKGROUND

High-performance processors adopt out-of-order processing to execute instructions while maintaining a high degree of parallelism. Out-of-order processing refers to processing of executing, while the reading of data of an instruction is delayed for some reason such as cache miss, the reading of data of a subsequent instruction, and thereafter executing the delayed reading of data of the instruction.

However, the above-described processing may cause a situation in which the latest data is extracted by the later executed reading of preceding data and old data is read by the previously executed reading of subsequent data, and thus may result in the violation of Total Store Ordering (TSO). The TSO indicates that the data reading result correctly reflects the data writing order, and is called consistency of execution order. The TSO is a type of memory ordering which specifies the constraints on the reordering of the order of actually writing data into a memory with respect to the order of instructions performing memory access. The TSO includes the following three rules.

(1) A load instruction must not be processed before a preceding load instruction.

(2) A store instruction must not be processed before a preceding load or store instruction.

(3) An atomic load/store instruction must not be processed before a preceding load or store instruction.

While a load instruction is allowed to be processed before a preceding store instruction, the other patterns of forwarding are disallowed as illustrated in FIG. 15. If a target data of the preceding store instruction contains the target data of the load instruction, the load instruction naturally requires to load the target data of the store instruction.

In a processor (CPU or CPU-CORE) that processes an out-of-order memory access, a load instruction is allowed to return data to an instruction control unit before a preceding load instruction. As illustrated in FIG. 16, the following processing is performed in an information processing device which includes an instruction control unit 100 and a primary cache control unit 200 for accessing a cache memory in accordance with a memory access request from the instruction control unit 100. For example, if the target data of a preceding load instruction (load-A) is cache-missed and the target data of a subsequent load instruction (load-B) is cache-hit, the primary cache control unit 200 returns the instruction control unit 100 the data of the subsequent load instruction (load-B) before the data of the preceding load instruction (load-A).

However, actual instruction execution is performed in accordance with the order of instructions. Therefore, even if load data are read in random order, software operating in an information processing device having a single processor configuration recognizes that the TSO is observed, as long as the TSO between load and store instructions is observed. In an information processing device having a multiprocessor configuration, however, software recognizes the TSO violation between load instructions in some cases.

FIGS. 17A to 17C illustrate a case in which store instructions store-A and store-B are issued in this order in a processor CPU-α to the data in areas A and B of the corresponding cache memory 212, and in which load instructions load-B and load-A are issued in this order in a processor CPU-β to the data in areas A and B of the corresponding cache memory 212.

In FIGS. 17A to 17C, an FP (Fetch Port) 210 is an instruction port for holding instructions accessing the data in the cache memory 212. The FP 210 holds the instructions in respective entries thereof identified by FP numbers 0 and 1. Further, each of the CPU-α and the CPU-β of an information processing device illustrated in FIGS. 17A to 17C includes an instruction control unit 100 and a primary cache control unit 200. Further, the CPU-α and the CPU-β share a secondary cache control unit 300 provided in a lower layer. In the following description, to identify the instruction control unit 100, the primary cache control unit 200, the FP 210, and the cache memory 212 of the CPU-α, the respective reference numerals will be attached with "a" and thus represented as 100a, 200a, 210a, and 212a, respectively. Similarly, to identify the instruction control unit 100, the primary cache control unit 200, the FP 210, and the cache memory 212 of the CPU-β, the respective reference numerals will be attached with "b" and thus represented as 100b, 200b, 210b, and 212b, respectively. If there is no need to identify the CPU-α or the CPU-β, the reference numerals 100, 200, 210, and 212 will simply be used.

As illustrated in FIG. 17A, in the primary cache control unit 200a of the CPU-α, the store instructions store-A and store-B are both cache-missed, and data requests are sent to the secondary cache control unit 300. Further, in the primary cache control unit 200b of the CPU-β, while the load instruction load-B is cache-missed and fails to return the target data to the instruction control unit 100b, the load instruction load-A is cache-hit and returns the target data data-A (old) to the instruction control unit 100b before the load instruction load-B.

Then, as illustrated in FIG. 17B, the process target instruction of the primary cache control unit 200a in the CPU-α is the store instruction store-A. Therefore, an invalidation request to the cache memory 212b of the CPU-β is issued via the secondary cache control unit 300, and thereafter two store instructions store-A and store-B are processed in this order.

Thereafter, as illustrated in FIG. 17C, the data in the area B subjected to the storage process is transferred from the CPU-α to the CPU-β. Then, the load instruction load-B is processed in the CPU-β, and the data data-B (new) is returned to the instruction control unit 100b.

As a result, two store instructions store-A and store-B have been issued in this order in the CPU-α. In the CPU-β, however, while the load instruction load-B has returned the data data-B (new) subjected to the storage process, the load instruction load-A has returned the data data-A (old) not subjected to the storage process. The instruction processing in the CPU-β has violated the prohibition by the TSO of forwarding of a load instruction before a preceding load instruction.

To prevent the violation, a subsequent load instruction is re-executed when there is a possibility of violation of the TSO. If there is a subsequent load instruction which has returned data before a preceding load instruction, and if the target data of the subsequent load instruction has been invalidated to allow another processor to use the data, the information indicating the above situation is stored in the corresponding processor. Then, when the preceding load instruction reads data, the possibility of TSO violation is notified to the instruction control unit 100, and instruction re-execution is performed starting from the next instruction, i.e., the subsequent load instruction.

For example, if the load instruction load-A is processed before the load instruction load-B in the CPU-β and thereafter the invalidation process on the data in the area A is requested, a flag indicating the above situation is validated. Thereafter, if the flag is valid when the load instruction load-B is processed and the corresponding data is returned, the instruction control unit 100b is notified of the possibility of TSO violation between the load instructions. Then, the instruction control unit 100b reissues the load instruction load-A. Therefore, the data returned thereafter by the load instruction load-A reflects the store instruction store-A of the CPU-α, and thus the TSO violation is prevented.

Japanese Patent No. 4180569 discloses a technique relating to cache memory control.

According to the method of preventing the TSO violation by re-executing a load instruction with the use of a flag, however, unnecessary instruction re-execution is requested. Therefore, the unnecessary instruction re-execution may cause a degradation of the processing performance, although the re-execution does not cause data corruption.

Such degradation of the processing performance is predicted to occur regularly, depending on a change in configuration or control of the secondary cache control unit caused by the multi-core configuration. In that case, the unnecessary instruction re-execution occurs regularly, and thus may cause substantially serious degradation of the performance in an information processing device which processes memory access in an out-of-order fashion.

SUMMARY

According to an embodiment of the invention, an information processing device includes a plurality of processing units which process an out-of-order memory access, each of the processing units includes a cache memory, an instruction port that holds instructions for accessing data in the cache memory in own entries, a first determination unit that validates a first flag, when the first determination unit receives an invalidation request for invalidating data stored in the cache memory after a target data of a load instruction is transferred from the cache memory to an arithmetic unit, and it is determined that a load instruction that has a cache index identical to a cache index of a target address of the received invalidating instruction exists in the instruction port, a second determination unit that validates a second flag, when it is determined that the target data of a load instruction held in an entry of the instruction port has been transferred after a cache miss of the target data occurred, and an instruction re-execution determination unit that instructs to re-execute an instruction that follows the load instruction, when it is determined that the first flag and the second flag are both valid when a load instruction held in an entry of the instruction port has been completed.

BRIEF DESCRIPTION OF DRAWINGS

FIG. 7 is a diagram illustrating a format of each of entries of the fetch port in the primary cache control unit;

DESCRIPTION OF EMBODIMENTS

Embodiments of the invention will be described with reference to FIGS. 5 to 14.

Figure 5:
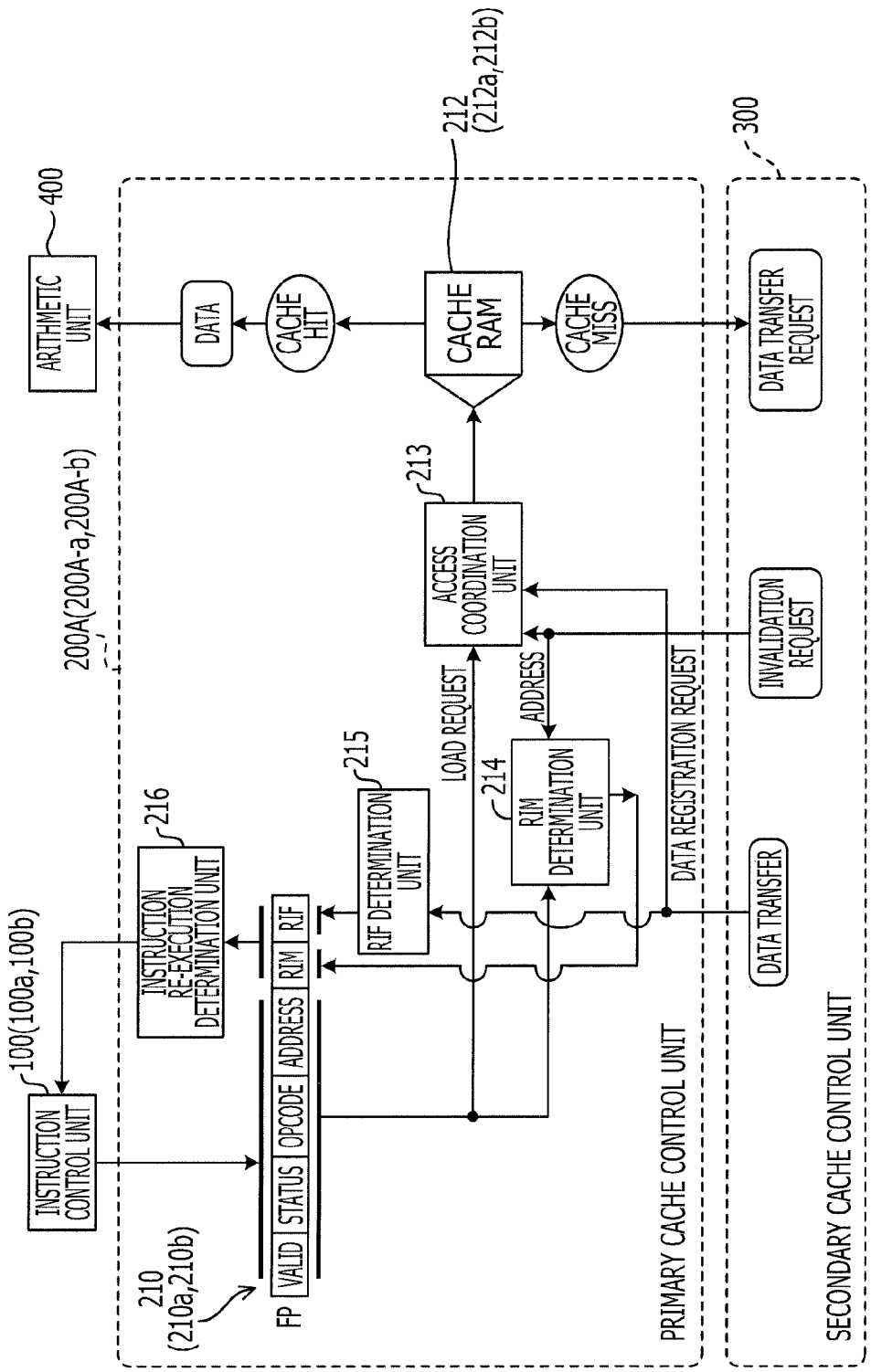
FIG. 5 is a block diagram illustrating a primary cache control unit having a function of preventing TSO violation.
Figure 6:
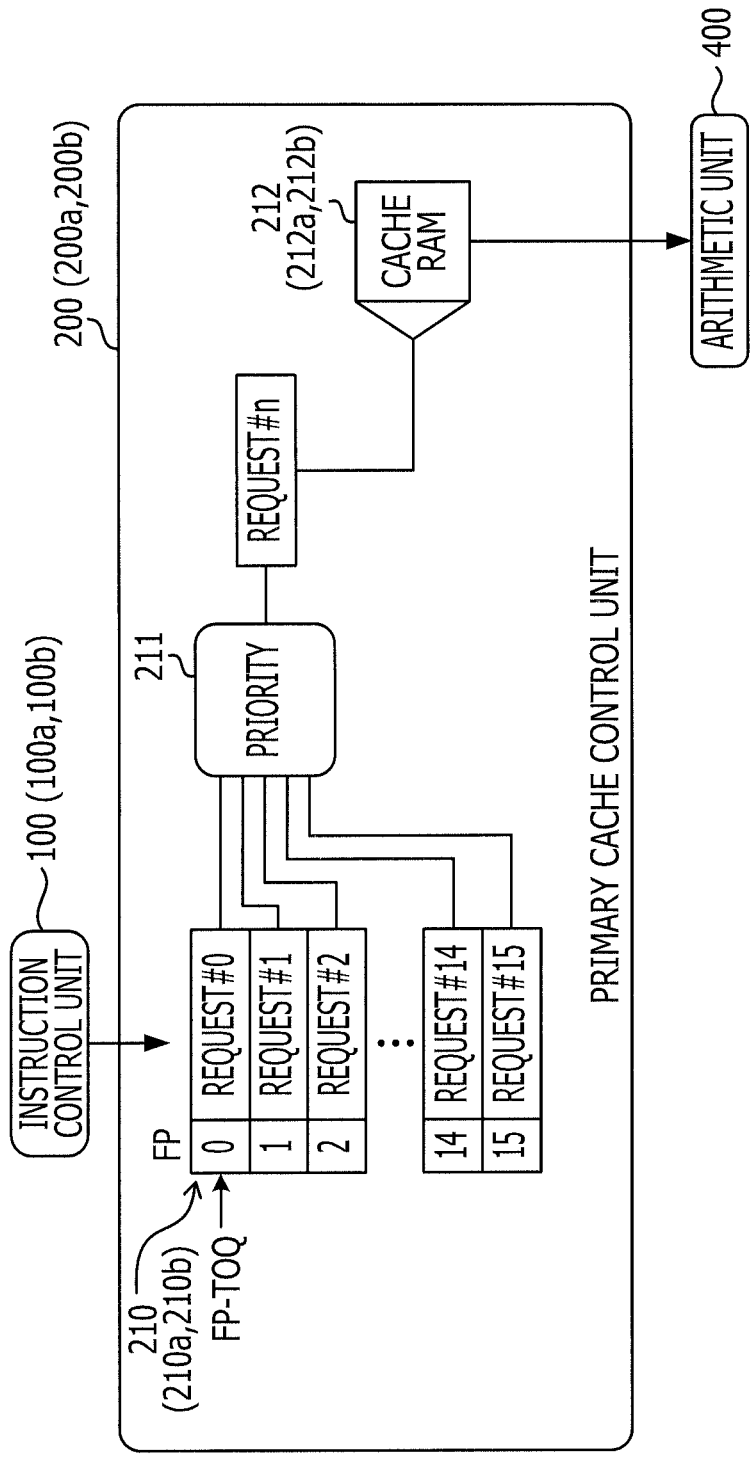
FIG. 6 is a block diagram illustrating a fetch port in the primary cache control unit.
Figure 8:
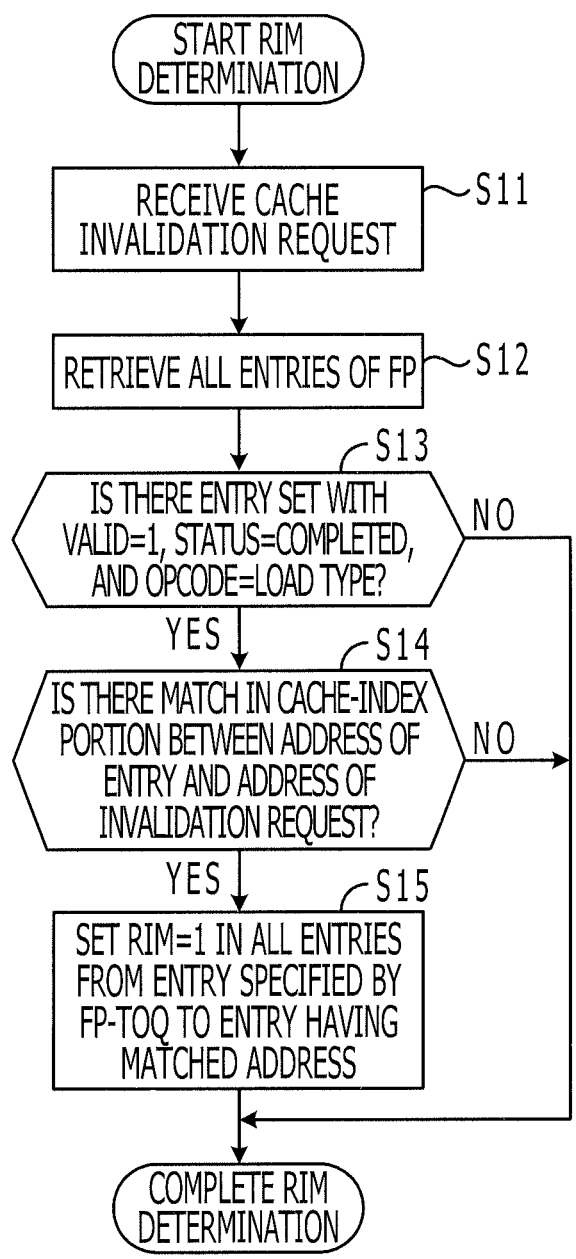
FIG. 8 is a flowchart for explaining a determination operation performed by a RIM determination unit.
Figure 17A:
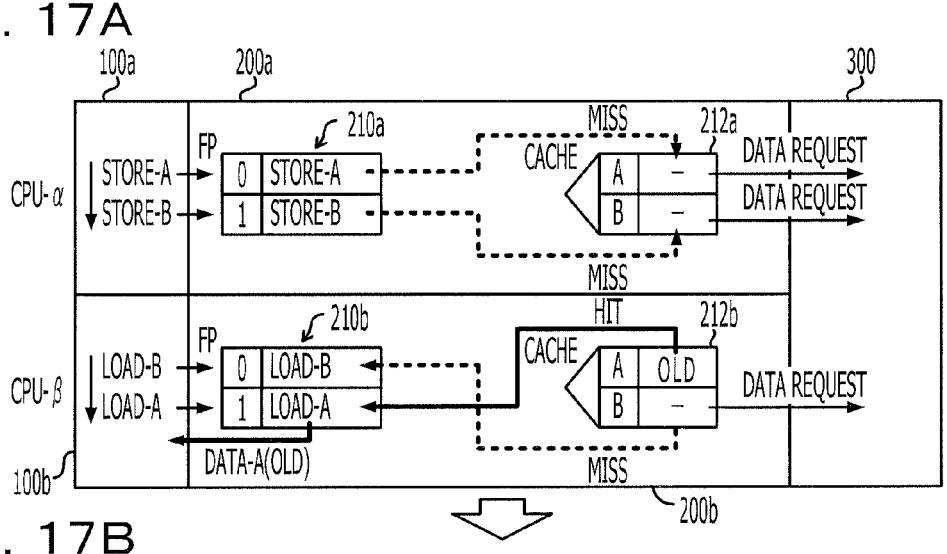
FIGS. 17A to 17C are diagrams for explaining an example of TSO violation occurring in a multiprocessor configuration.
Figure 17B:
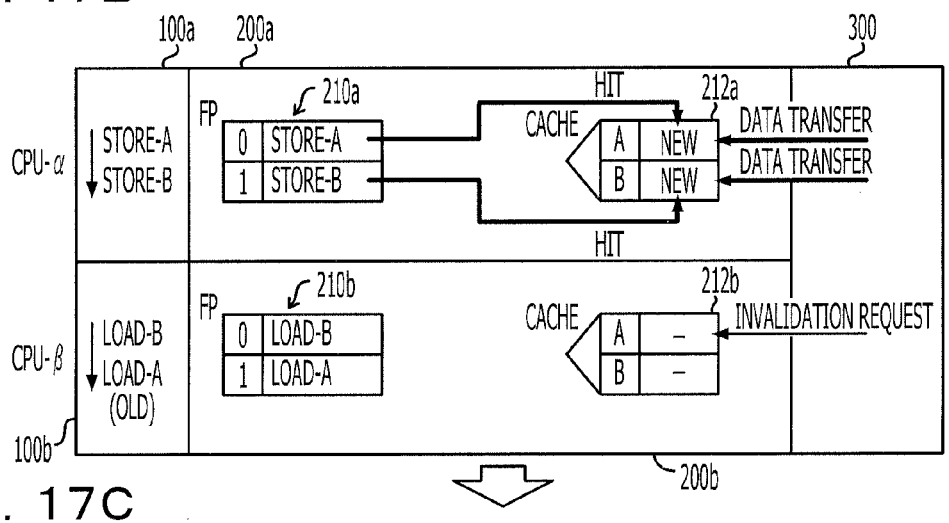
Figure 17C:
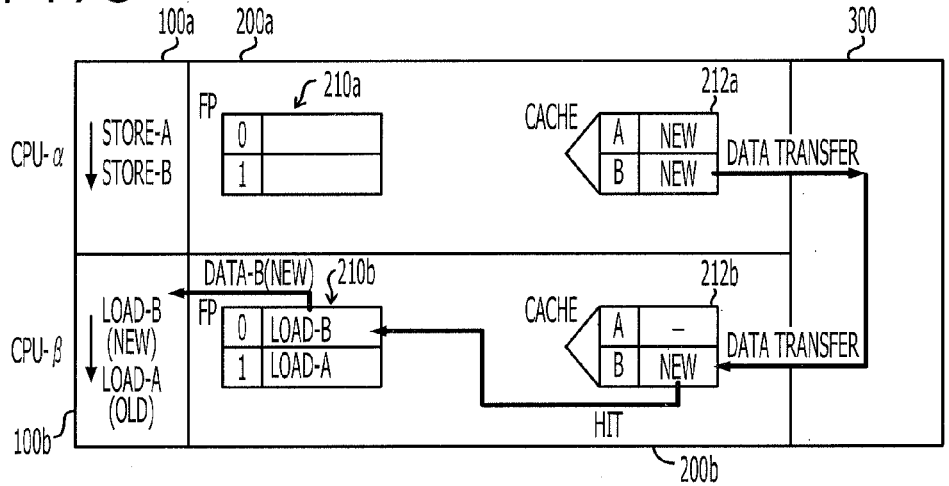

FIG. 5 is a block diagram illustrating a configuration of a primary cache control unit 200 of an embodiment, having a function of preventing the TSO violation illustrated in FIGS. 17A to 17C. FIG. 6 is a block diagram illustrating a configuration of an FP (Fetch Port) 210 in the primary cache control unit 200 illustrated in FIG. 5. FIG. 7 is a diagram illustrating a format of each of entries of the FP 210 in the primary cache control unit 200 illustrated in FIG. 5.

Cache access requests from an instruction control unit 100 are temporarily held in the FP 210 of the primary cache control unit 200. An example of the configuration of the FP 210 is illustrated in FIG. 6. The requests are each assigned to the respective entry of the FP 210 in accordance with the order thereof in a program, and are each stored in the assigned entry. The entries of the FP 210 are cyclically used. For example, if the FP 210 has sixteen entries, the requests from the instruction control unit 100 are sequentially assigned to the entries starting from an entry FP #0. After an entry FP #15, the entry FP #0 is assigned to the next request. FP #n (n is a number selected from 0 to 15) identifies one of the entries of the FP 210, and may be referred to as "FP number".

As illustrated in FIG. 6, the FP 210 includes a priority unit 211. The priority unit 211 coordinates which one of the requests in the entries of the FP 210 (requests #0 to #15) should be processed. To guarantee the TSO, the priority unit 211 guarantees that a subsequent store instruction in the instruction processing order is not processed before a preceding load or store instruction, and allows a subsequent load instruction to be processed before a preceding load instruction. On that basis, the priority unit 211 selects, one by one, the entries of the FP 210 (request #n) in an out-of-order fashion, i.e., in random order, to perform processes of the selected instructions. Further, the entries of the FP 210 are sequentially released in an in-order fashion starting from the oldest entry. The oldest valid entry is specified by an FP-TOQ (Fetch-Port-Top-of-Queue). An entry of the FP 210 not specified by the FP-TOQ is not released immediately after the completion of the process of the instruction stored in the entry. Then, upon completion of the process of the instruction stored in the entry specified by the FP-TOQ, the entries storing the processed instructions are released in chronological order starting from the entry specified by the FP-TOQ.

FIG. 7 illustrates a format, or contents, of each of the entries of the FP 210. As illustrated in FIG. 7, each of the entries of the FP 210 holds "valid," "status," "opcode," "address," "RIM," and "RIF,". "valid" is a flag indicating whether or not the entry is valid. "status" is a flag indicating whether or not the process of the cache access request held in the entry has been completed. "opcode" represents the type of the cache access request held in the entry (e.g., load or store). "address" represents the address of the cache access request held in the entry. "RIM" and "RIF" are flags used in a TSO guarantee control. The RIM flag is validated by a later-described RIM determination unit 214, if the target data of a load instruction held in an entry is cast out of a cache memory 212 in accordance with an invalidation request received during a period from the transfer of the target data to an arithmetic unit 400 in accordance with the load instruction up to the entry is released. The RIM flag is an example of a "first flag." The RIF flag is validated by a later-described RIF determination unit 215, if the target data of a load instruction held in an entry is transferred after a cache miss of the load instruction. The RIF flag is an example of a "second flag."

With reference to FIG. 5, description will be made of a detailed configuration and operation of the primary cache control unit 200 including the FP 210 and the priority unit 211 configured as described above. The primary cache control unit 200 of FIG. 5 has a configuration for fulfilling an instruction re-execution request to guarantee the TSO. More specifically, the primary cache control unit 200 has a function of preventing the TSO violation illustrated in FIGS. 17A to 17C.

As illustrated in FIG. 5, the primary cache control unit 200 is connected to the instruction control unit 100 and the arithmetic unit 400, and is also connected to a secondary cache control unit 300. The primary cache control unit 200 includes, in addition to the FP 210 and the priority unit 211, a cache memory (cache RAM) 212, an access coordination unit 213, a RIM determination unit 214, a RIF determination unit 215, and an instruction re-execution determination unit 216. For the sake of convenience, FIG. 5 only illustrates one entry of the FP 210 which includes a plurality of entries, and illustration of the priority unit 211 is omitted.

The priority unit 211 selects one of the requests held in the entries of the FP 210, and accesses the cache memory 212 to process the selected request. The access coordination unit 213 coordinates the accesses of requests to the cache memory 212, such as the request selected by the priority unit 211 and a data registration request and an invalidation request received from the secondary cache control unit 300. If the request from the FP 210 acquires a priority as a result of coordination by the access coordination unit 213, an access to the cache memory 212 for processing the request having acquired a priority is executed. If the request to be processed is a load request, for example, the target data of the load request is searched for in the cache memory 212. Then, if the target data is cache-hit, the data is transferred to the arithmetic unit 400. Meanwhile, if the target data is cache-missed, a request for transferring the data is issued to the secondary cache control unit 300.

Upon receipt of a response from the secondary cache control unit 300 which transfers the data in response to the request for transferring the data, the primary cache control unit 200 sends the access coordination unit 213 a request for registering the data (data registration request). Then, if the request for registering the data acquires a priority as a result of coordination by the access coordination unit 213, the data is registered in the cache memory 212. Also, information relating to the request for registering the data is transmitted from the secondary cache control unit 300 to the RIF determination unit 215. On the basis of the information relating to the registration request, the RIF determination unit 215 determines, in accordance with the flowchart illustrated in FIG. 9, whether or not to validate the RIF flag in the entries of the FP 210.

If data to be registered into the cache memory 212 is transferred from the secondary cache control unit 300 (S21), the RIF determination unit 215 retrieves all of the entries of the FP 210 (S22). The RIF determination unit 215 determines whether or not an entry set with a value of "valid=1," i.e., a valid entry is present in the FP 210 (S23). If a valid entry is present in the FP 210 (YES at S23), the RIF determination unit 215 sets the RIF flag to a value of "1" in all entries of the FP 210 from the entry specified by the FP-TOQ to the valid entry (S24). In other words, if a load instruction held in an entry of the FP 210 is cache-missed and thereafter the target data of the load instruction is transferred from the secondary cache control unit 300, the RIF determination unit 215 validates the RIF flag of the corresponding entries. If a valid entry is absent in the FP 210 (NO at S23), the RIF determination unit 215 completes the RIF determination process.

Further, upon receipt from the secondary cache control unit 300 of an invalidation request to the cache memory 212, the primary cache control unit 200 sends the received invalidation request to the access coordination unit 213. Then, if the invalidation request from the secondary cache control unit 300 acquires a priority as a result of coordination by the access coordination unit 213, the corresponding data in the cache memory 212 is invalidated. Also, information relating to the invalidation request from the secondary cache control unit 300 is sent to the RIM determination unit 214. On the basis of the information relating to the invalidation request, the RIM determination unit 214 determines, in accordance with the flowchart illustrated in FIG. 8, whether or not to validate the RIM flag in the entries of the FP 210.

Upon receipt from the secondary cache control unit 300 of an invalidation request to the cache memory 212 (S11), the RIM determination unit 214 retrieves all of the entries of the FP 210 (S12). Then, the RIM determination unit 214 determines whether or not an entry set with values of "valid=1," "status=completed," and "opcode=load type" is present in the FP 210 (S13). The RIM determination unit 214 determines whether or not an invalidation request for invalidating the target data in the cache memory 212 has been received from the secondary cache control unit 300 during a period between the transfer of the target data from the cache memory 212 to the arithmetic unit 400 in accordance with a load instruction held in the FP 210 and the release of the entry. If such an entry is present in the FP 210 (YES at S13), the RIM determination unit 214 determines whether or not the cache-index portion of the address of the entry matches with the cache-index portion of the target address of the invalidation request received from the secondary cache control unit 300 (S14). If the two addresses match each other (YES at S14), the RIM determination unit 214 sets the RIM flag to a value of "1" in all entries from the entry specified by the FP-TOQ to the entry having the matched address (S15). In other words, if the target data of a load instruction held in an entry of the FP 210 is cast out of the cache memory 212 in accordance with an invalidation request during a period since the target data is transferred to the arithmetic unit 400 in accordance with the load instruction until the entry is released, the RIM determination unit 214 validates the RIM flag of the corresponding entries. If a target entry is absent in the FP 210 (NO at S13 or S14), the RIM determination unit 214 completes the RIM determination process.

Figure 10:
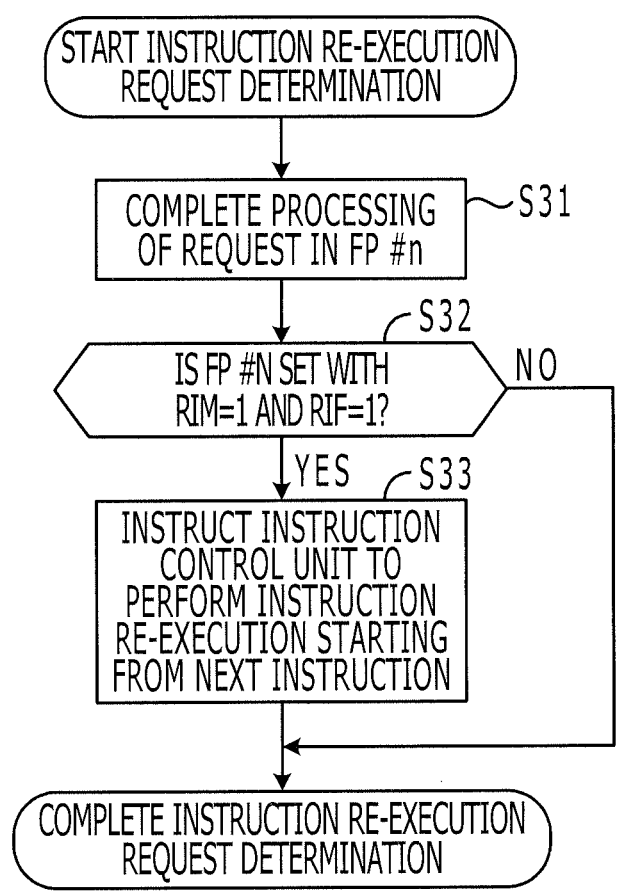
FIG. 10 is a flowchart for explaining an example of the operation performed by an instruction re-execution determination unit.

Upon completion of the process of the instruction stored in each of the entries in the FP 210, the instruction re-execution determination unit 216 refers to the RIM flag and the RIF flag in the entry, and determines, in accordance with the flowchart illustrated in FIG. 10, whether or not to re-execute the instruction stored in the entry.

Upon completion of the process of the request stored in each of the entries (FP #n) of the FP 210 (S31), the instruction re-execution determination unit 216 determines whether or not the RIM flag and the RIF flag are both valid, i.e., whether or not values of "RIM=1" and "RIF=1" are set in the entry FP #n (S32). If both of the flags are valid (YES at S32), the instruction re-execution determination unit 216 issues an instruction re-execution request to the instruction control unit 100 to instruct the instruction control unit 100 to perform instruction re-execution starting from the instruction following the instruction corresponding to the entry. If NO is determined at S32, the instruction re-execution determination unit 216 completes the determination process.

Subsequently, with reference to FIGS. 11A to 11C and FIGS. 12A and 12B, description will be made of an operation performed by the primary cache control unit 200 to prevent the TSO violation illustrated in FIGS. 17A to 17C, i.e., an operation of requesting instruction re-execution to guarantee the TSO.

FIGS. 11A to 11C and FIGS. 12A and 12B are diagrams for explaining an example of a TSO violation preventing operation in a multiprocessor configuration performed by the primary cache control unit 200 illustrated in FIG. 5. Similarly to the case illustrated in FIGS. 17A to 17C, FIGS. 11A to 11C and FIGS. 12A and 12B also illustrate a case in which store instructions store-A and store-B are issued in this order in a processor CPU-α to the data in areas A and B of a cache memory 212a, and in which load instructions load-B and load-A are issued in this order in a processor CPU-β to the data in areas A and B of a cache memory 212b.

Figure 11A:
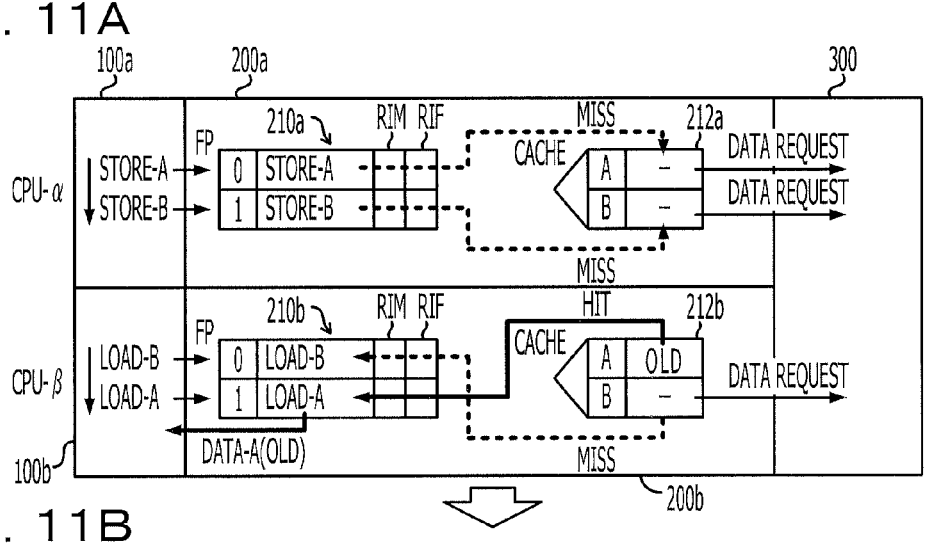
FIGS. 11A to 11C are diagrams for explaining a TSO violation preventing operation in a multiprocessor configuration performed by the primary cache control unit.

As illustrated in FIG. 11A, when the CPU-β processes the load instructions in the order of load-B and load-A, if the FP-TOQ is set to 0, the load instruction load-B is set in the entry FP #0, and the load instruction load-A is set in the entry FP #1. It is assumed herein that the load instruction load-B is cache-missed, and that a request for transferring the data of the area B is sent to the secondary cache control unit 300. Meanwhile, the load instruction load-A is assumed to be cache-hit. In this case, the load instruction load-A precedes the load instruction load-B, and the data data-A (old) is transferred from the cache memory 212b to the arithmetic unit 400 (instruction control unit 100b). Therefore, the processing of the load instruction load-A is completed. Further, as illustrated in FIG. 11A, when the CPU-α processes the store instructions in the order of store-A and store-B, the store instruction store-A is set in the entry FP #0, and the store instruction store-B is set in the entry FP #1. It is assumed that the store instructions store-A and store-B are both cache-missed, and that a request for transferring the data of the area A and a request for transferring the data in the area B are sent to the secondary cache control unit 300.

Figure 11B:
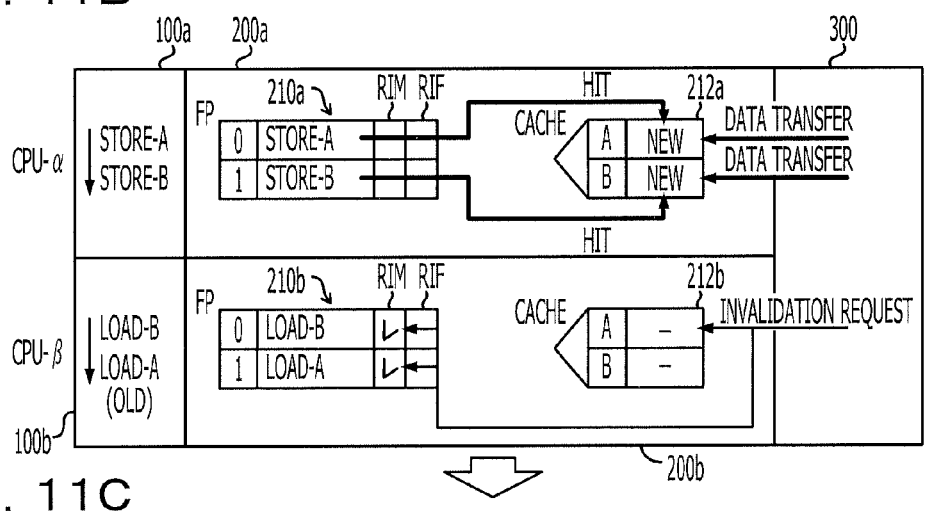

In this case, the data corresponding to the store instruction store-A (data-A (old)) is present in the CPU-β. Therefore, as illustrated in FIG. 11B, an invalidation request is issued to the primary cache control unit 200b of the CPU-β via the secondary cache control unit 300. Then, as illustrated in FIG. 11B, the data corresponding to the store instruction store-A and the data corresponding to the store instruction store-B are transferred to the primary cache control unit 200a of the CPU-α and registered in the cache memory 212a. Thereafter, the store instructions store-A and store-B are executed, and the areas A and B of the cache memory 212a are updated (data-A (new) and data-B (new)).

Further, as illustrated in FIG. 11B, the primary cache control unit 200b of the CPU-β validates the RIM flag in the entries of the FP 210b by the function of the RIM determination unit 214. That is, the RIM determination unit 214 determines that there is a match between the address of the cache-index portion of the already processed load instruction in the entry FP #1 and the address of the cache-index portion of the invalidation process request. In accordance with the determination result, the RIM flag indicating the possibility of updating of data (data-A (old)) by another CPU (CPU-α in this case) is validated.

Figure 11C:
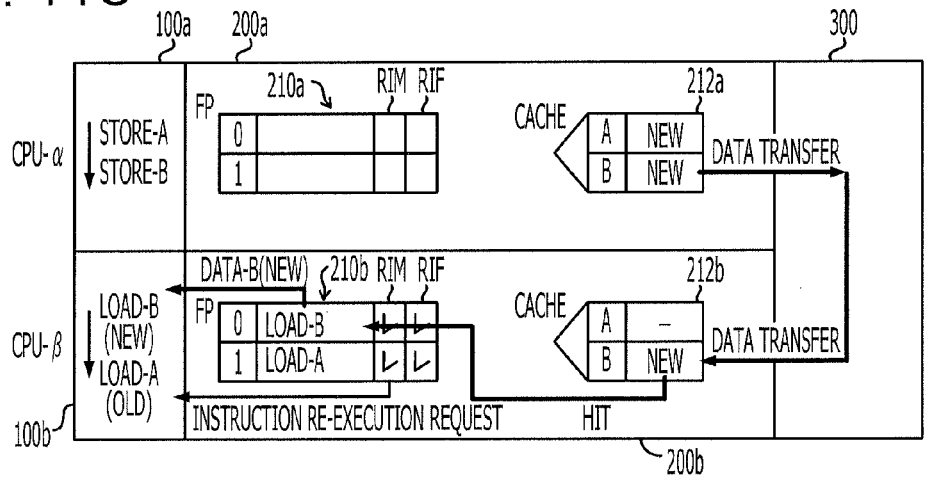

The data of the area B requested by the load instruction load-B in the CPU-β is held by the CPU-α. Therefore, as illustrated in FIG. 11C, the data updated by the store instruction store-B (data-B (new)) is transferred from the CPU-α to the CPU-β, and the transferred data data-B (new) is stored in the area B of the cache memory 212b of the CPU-β. In this case, the RIF flag is validated by the function of the RIF determination unit 215 in the primary cache control unit 200b of the CPU-β. That is, the RIF determination unit 215 validates the RIF flag in all valid entries (all entries set with a value of valid=1) of the FP 210b, i.e., the flag indicating the possibility of data transfer from another CPU (CPU-α in this case).

Then, when the data data-B (new) stored in the area B of the cache memory 212b of the CPU-β is transferred to the arithmetic unit 400 (instruction control unit 100b) in accordance with the load instruction load-B and the processing of the load instruction load-B is completed, the instruction re-execution determination unit 216 checks whether or not the RIM flag and the RIF flag of the entry FP #0 are both valid. In the example illustrated in FIG. 11C, the flags are both valid. Therefore, the instruction re-execution determination unit 216 determines that there is a possibility of TSO violation, and requests the instruction control unit 100b to perform instruction re-execution.

Figure 12A:
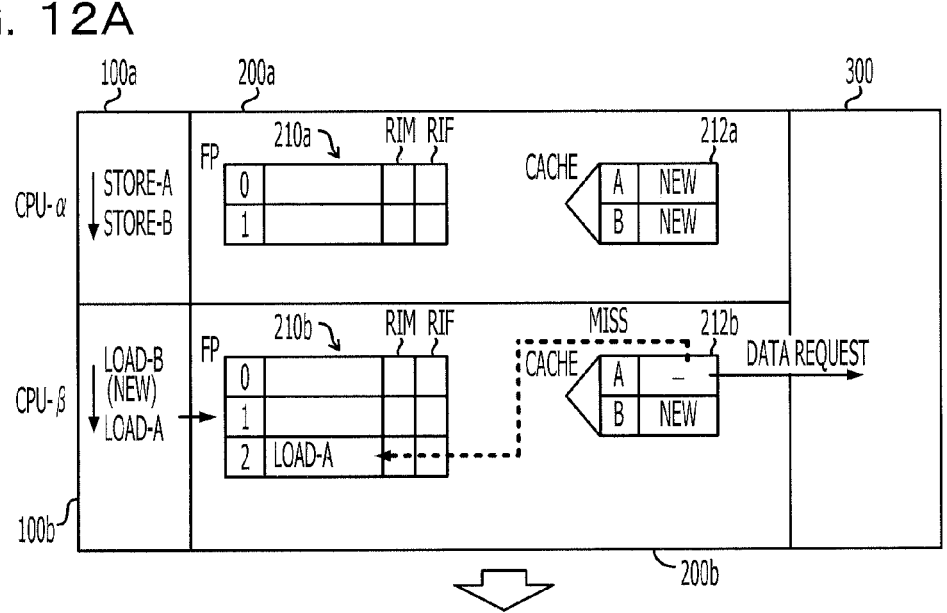
FIGS. 12A and 12B are diagrams for explaining a TSO violation preventing operation in a multiprocessor configuration performed by the primary cache control unit.
Figure 12B:
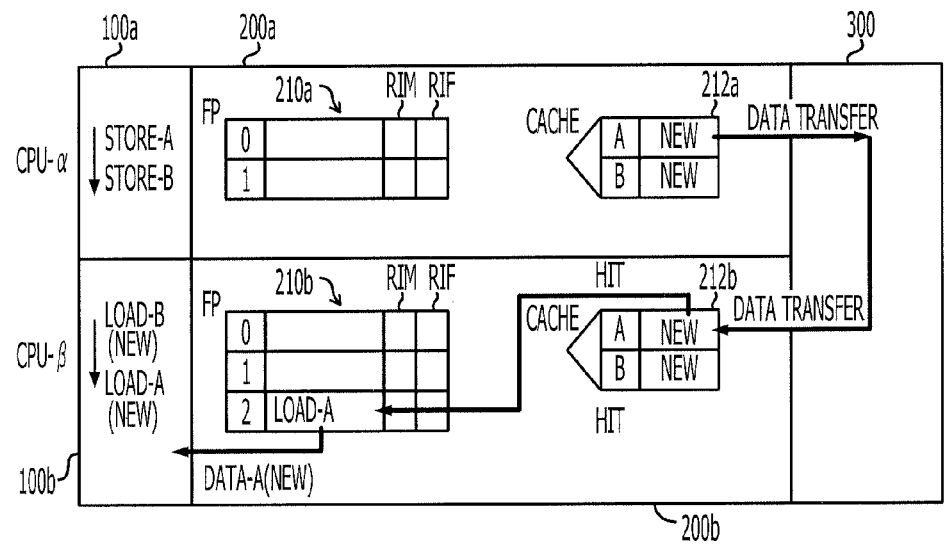

In accordance with the instruction re-execution request, the instruction control unit 100b of the CPU-β re-executes the load instruction load-A, as illustrated in FIG. 12A. That is, the load instruction load-A in the entry FP #1, which is the instruction following the load instruction load-B in the entry FP #0, is re-executed. In FIG. 12A, however, the load instruction load-A is once cache-missed, and a request for transferring data to the area A is sent to the secondary cache control unit 300. In this case, the data corresponding to the load instruction load-A is present in the CPU-α. As illustrated in FIG. 12B, therefore, the data data-A (new) updated by the store instruction store-A is transferred from the CPU-α to the CPU-β, and the transferred data data-A (new) is stored in the area A of the cache memory 212b of the CPU-β. Then, the updated data data-A (new) is transferred to the arithmetic unit 400 (instruction control unit 100b). According to the above-described operation, the TSO violation illustrated in FIGS. 17A to 17C is resolved.

In the primary cache control unit 200 having the function of preventing the TSO violation, which has been described above with reference to FIGS. 5 to 12B, an unnecessary instruction re-execution request may be issued in a circumference described below, and thus may result in degradation of the processing performance. The circumference will be described with reference to FIGS. 13 and 14.

Figure 13:
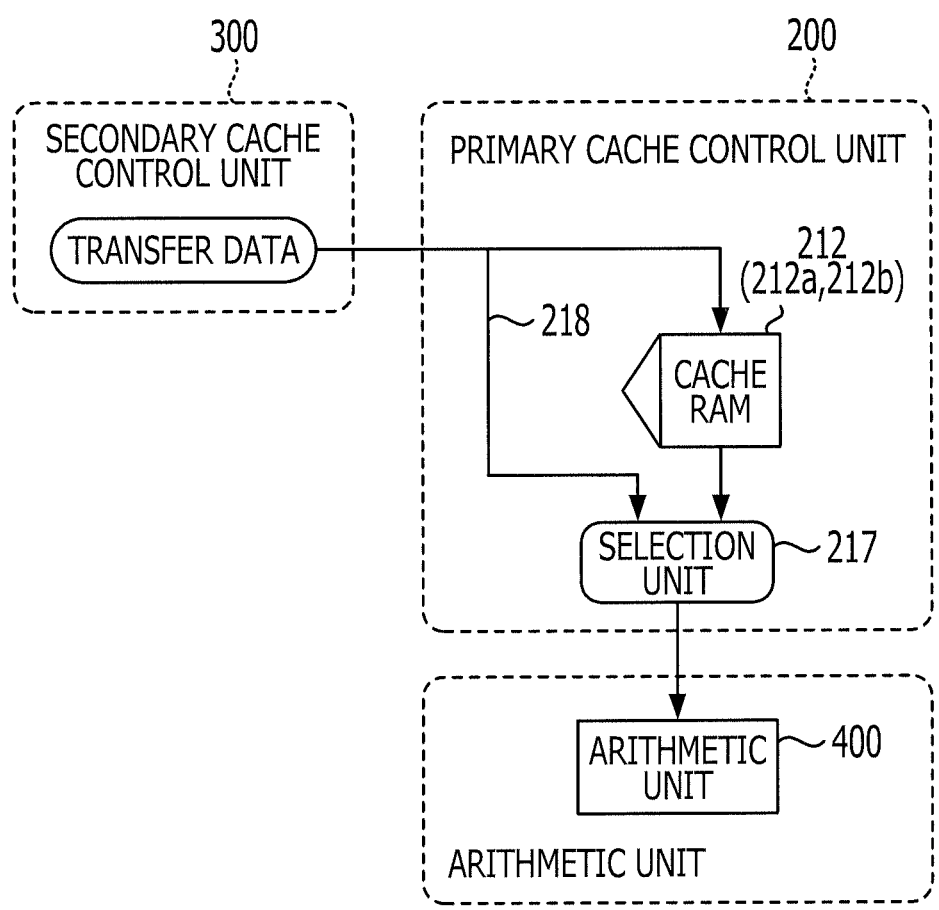
FIG. 13 is a block diagram illustrating a cache bypass configuration of the primary cache control unit.
Figure 14:
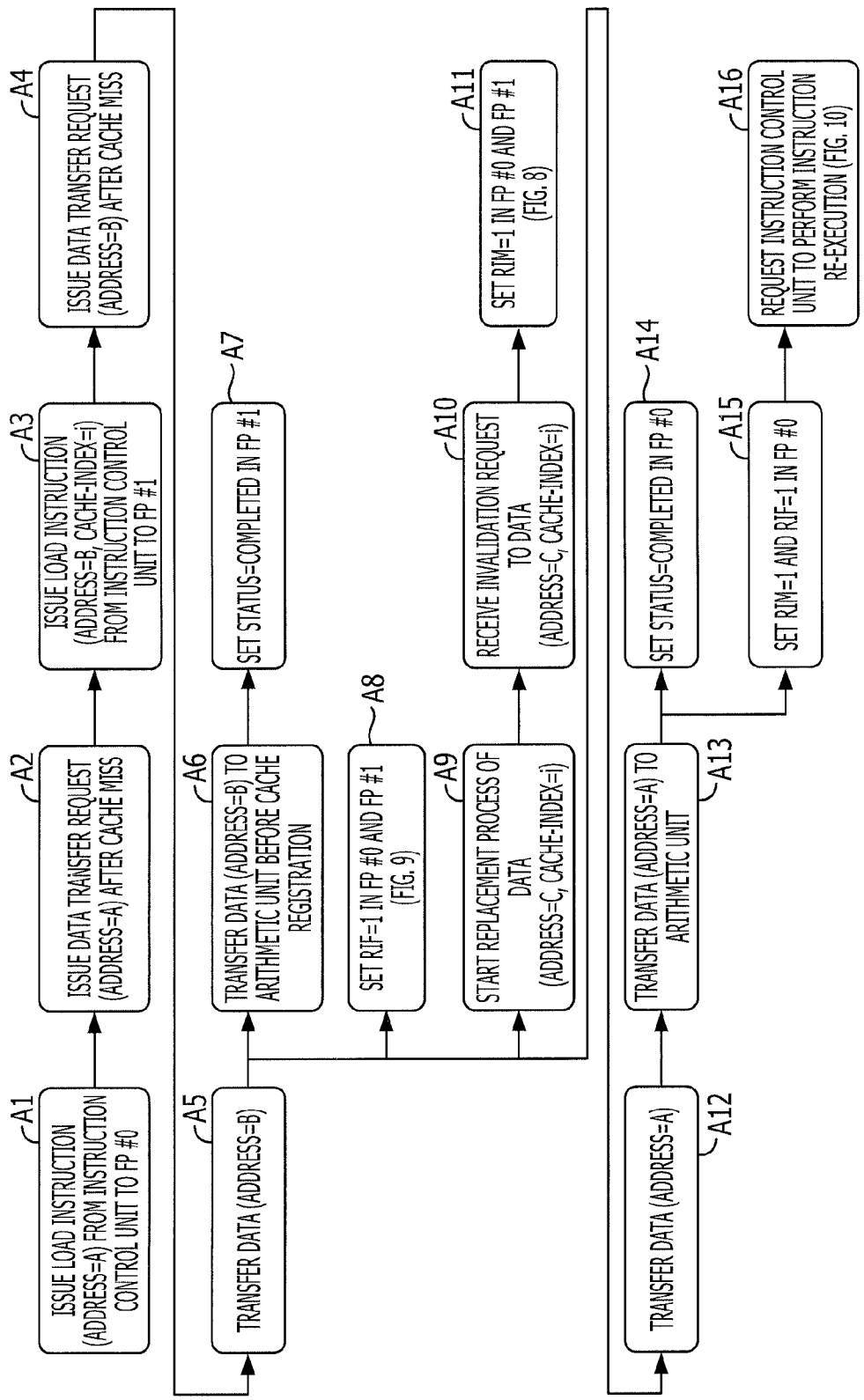
FIG. 14 is a flow diagram for explaining a case in which an unnecessary instruction re-execution request is generated by unnecessary RIM flag validation.
Figure 15:
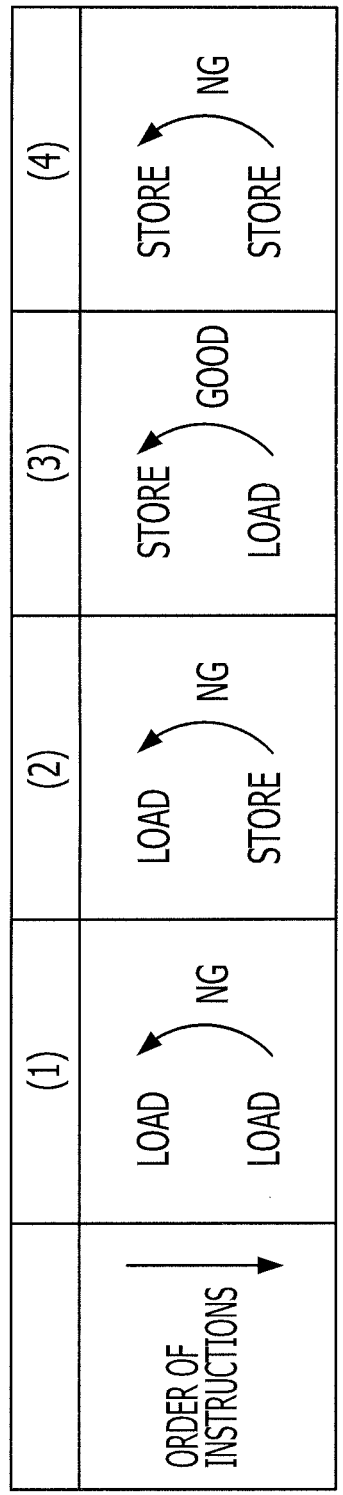
FIG. 15 is a diagram illustrating common TSO rules.
Figure 16:
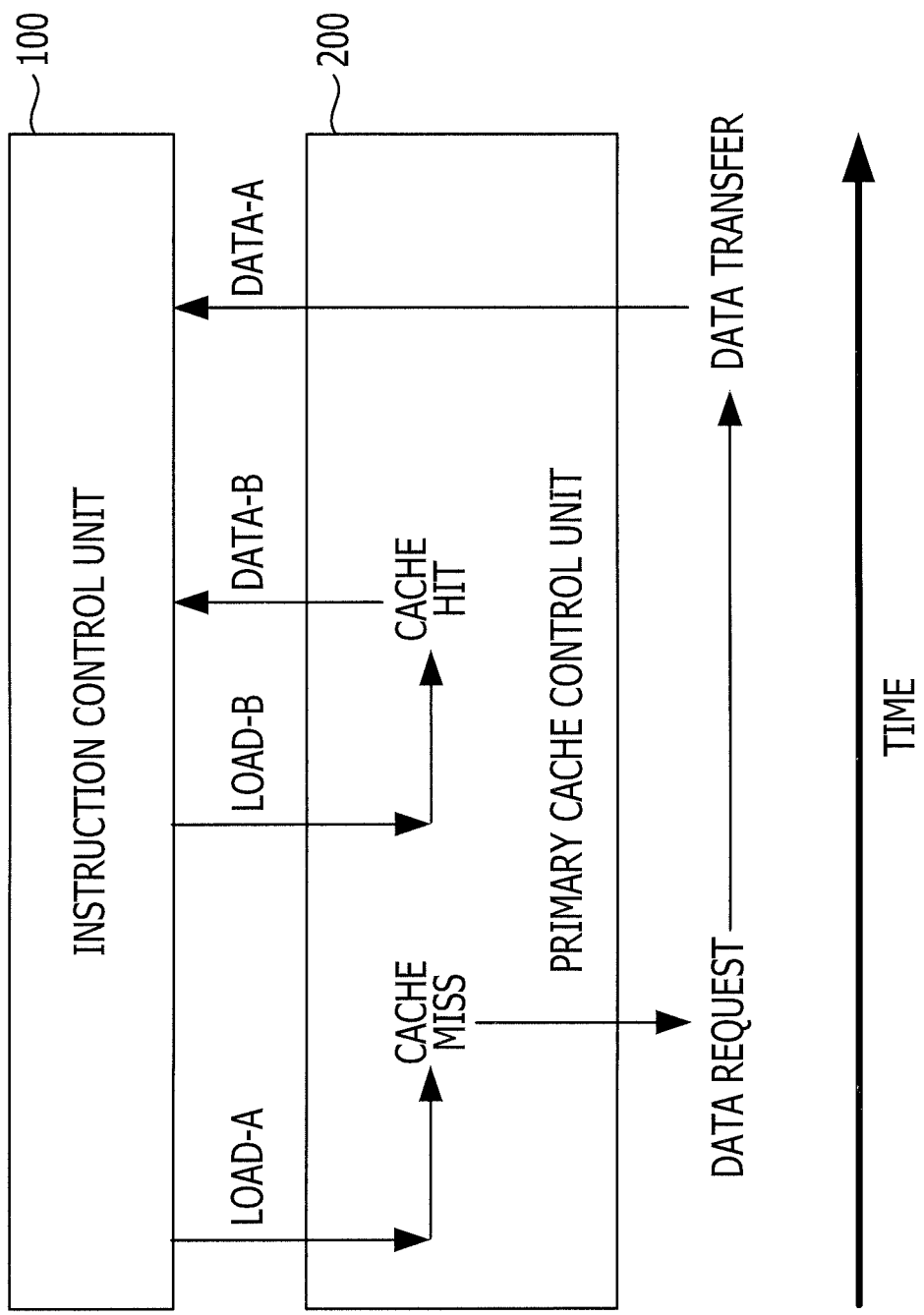
FIG. 16 is a diagram illustrating an example of forwarding of a load instruction before a preceding load instruction occurring in a processor which performs out-of-order processing.

FIG. 13 is a block diagram illustrating an example of a cache bypass configuration of the primary cache control unit 200. Further, FIG. 14 is a flow diagram for explaining an example of a case in which unnecessary RIM flag validation generates an unnecessary instruction re-execution request.

As described above with reference to FIG. 8, the condition for the RIM determination unit 214 to validate the RIM flag is the match between the address (cache-index) of the processed load instruction in the FP 210 and the target address (cache-index) of the invalidation request. The invalidation request is generated when the data held in the cache memory 212 of a processor is transferred to the cache memory 212 of another processor. The invalidation request is also generated when, in order to register a data item in the cache memory 212, a data item already existing in the registration destination is replaced by the data item. In this case, the address of the cache-index portion of the cache-missed load instruction always matches the address of the cache-index portion of the invalidation request accompanying the replacement process of the existing data item.

Meanwhile, in order to increase the processing speed, some information processing devices include a mechanism for transferring, before registering in a cache memory cache registration data transferred from a lower-layer cache memory or a main memory, the cache registration data to an arithmetic unit by bypassing the cache memory. In the example illustrated in FIG. 13, the primary cache control unit 200 is provided with a bypass 218 for allowing the transfer data from the secondary cache control unit 300 to bypass the cache memory 212. The primary cache control unit 200 is further provided with a selection unit 217 for selecting either one of the data from the bypass 218 and the data from the cache memory 212 and outputting the selected data to the arithmetic unit 400.

With reference to the flow diagram illustrated in FIG. 14, description will be made of a case in which unnecessary RIM flag validation generates an unnecessary instruction re-execution request in the primary cache control unit 200 having the bypass configuration. It is now assumed that, the registration of the transfer data into the cache memory 212 is bypassed and the data is transferred to the arithmetic unit 400 before being registered into the cache memory 212 when the data corresponding to the cache-missed load instruction is transferred from the secondary cache control unit 300. It is further assumed that, in accordance with the replacement process accompanying the registration of the data into the cache memory 212, the invalidation process is performed on data having the same cache-index as the cache-index of the load instruction but having a different address from the target address of the load instruction. In this case, as illustrated in FIG. 14, the RIM flag is unnecessarily validated, and an unnecessary instruction re-execution request is generated.

In the case illustrated in FIG. 14, the instruction control unit 100 first issues a load instruction (address=A) to the entry FP #0, and the entry FP #0 is secured (A1). In the event of cache miss, i.e., if the data corresponding to the load instruction (address=A) is absent in the cache memory 212 (hereinafter occasionally referred to as the primary cache memory 212), the primary cache control unit 200 issues a data transfer request (address=A) to the secondary cache control unit 300 (A2). Then, the instruction control unit 100 issues a load instruction (address=B) to the entry FP #1, and the entry FP #1 is secured (A3). It is assumed herein that the cache-index of the load instruction (address=B) in the primary cache memory 212 is i. If the data corresponding to the load instruction (address=B) is also absent in the primary cache memory 212, the primary cache control unit 200 issues a data transfer request (address=B) to the secondary cache control unit 300 (A4).

Thereafter, it is assumed that a transfer request of the target data of the subsequent load instruction (address=B) issued at A3 is issued by the secondary cache control unit 300 before a transfer request of the target data of the preceding load instruction (address=A) issued at A1 (A5). With the receipt of the data transfer request, the primary cache control unit 200 transfers, in accordance with the bypass configuration described with reference to FIG. 13, the target data of the subsequent load instruction (address=B) to the arithmetic unit 400 before registering the data into the primary cache memory 212 (A6). Therefore, the status of the entry FP #1 is set to "completed" (A7).

Figure 9:
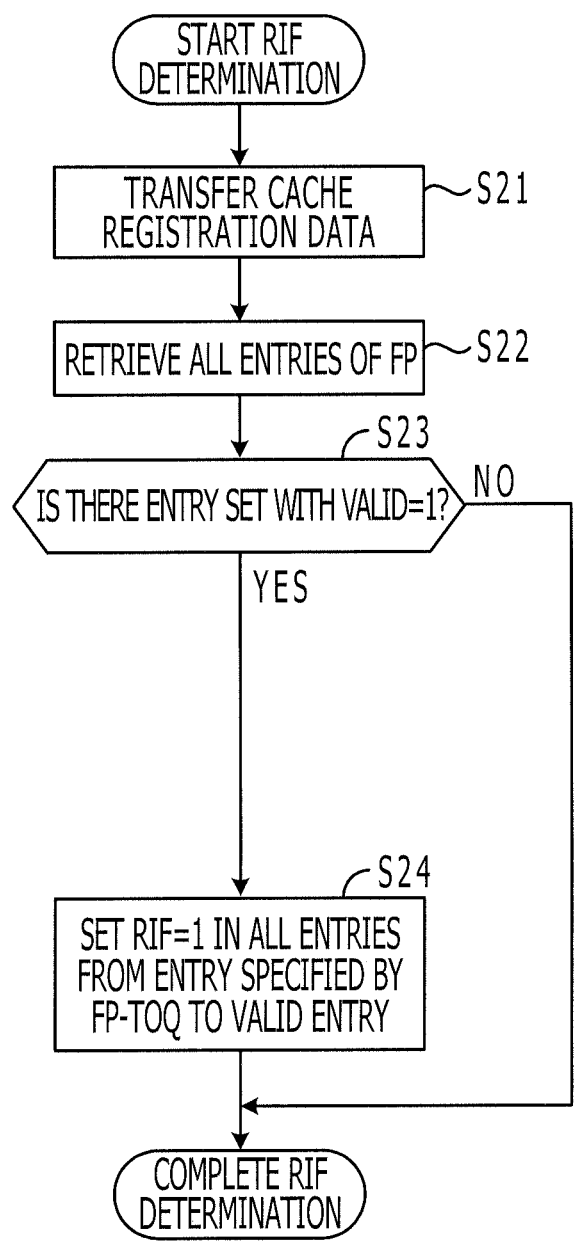
FIG. 9 is a flowchart for explaining a determination operation performed by a RIF determination unit.

Meanwhile, with the receipt of the data transfer request from the secondary cache control unit 300, the RIF determination unit 215, which performs a determination in accordance with the procedure illustrated in FIG. 9, sets the RIF flag to a value of "1" in the entries FP #0 and the FP #1 (A8).

Further, with the receipt of the data transfer request from the secondary cache control unit 300, the replacement process of an entirely different data item already registered in the cache-index index=i of the primary cache memory 212 (address=C, index=i) starts to be performed to register the data having the address address=B and the cache-index index=i (A9). In accordance with the replacement process, the primary cache control unit 200 receives from the secondary cache control unit 300 an invalidation request for invalidating the data having the address address=C and the cache-index index=i (A10). In this case, the cache-index of the data to be subjected to the invalidation process (index=i) matches the cache-index of the entry FP #1. Therefore, the RIM determination unit 214, which performs a determination in accordance with the procedure illustrated in FIG. 8, sets the RIM flag to a value of "1" in the entries FP #0 and the FP #1 (A11).

Thereafter, a transfer request of the target data of the preceding load instruction (address=A) issued at A1 is issued by the secondary cache control unit 300 (A12). Then, in accordance with the bypass configuration described with reference to FIG. 13, the target data of the preceding load instruction (address=A) is transferred to the arithmetic unit 400 before being registered into the primary cache memory 212 (A13). Therefore, the status of the entry FP #0 is set to "completed" (A14). In this case, the RIM flag and the RIF flag are both set to a value of "1" in the entry FP #0 (A15). Therefore, the instruction re-execution determination unit 216, which performs a determination in accordance with the procedure illustrated in FIG. 10, issues an instruction re-execution request to the instruction control unit 100 (A16).

As described in accordance with the above series of flows, the invalidation request for invalidating the data the same in cache-index as but entirely different from the transfer data (address B≠address C) results in the validation of RIM flag and the generation of an unnecessary instruction re-execution request. As a result, unnecessary instruction re-execution becomes a cause for degradation of the processing performance of the information processing device, although the re-execution does not cause data corruption. Meanwhile, the RIF flag is a flag validated when data is transferred from a lower-layer cache memory, e.g., the secondary cache control unit 300, or from a memory. If the RIF flag is validated when the RIM flag is invalid, however, the TSO violation will not occur, even if an invalidation process validating the RIM flag is requested thereafter. As illustrated in FIGS. 11A to 12B, the occurrence of the TSO violation is limited to the case in which, after the RIM flag is validated by the invalidation process accompanying the storage process performed in another CPU, the data subjected to the storage process in the another CPU is transferred to the CPU and the RIF flag is validated. Therefore, there is no need to validate the RIF flag before the RIM flag is validated. Despite this, according to the RIF determination unit 215, which performs a determination in accordance with the procedure illustrated in FIG. 9, the RIM flag can be validated after the RIF flag is validated. Therefore, an unnecessary instruction re-execution request is generated. Also in this case, therefore, unnecessary instruction re-execution becomes a cause for degradation of the processing performance of the information processing device.

The above-described causes for degradation of the processing performance are attributed to the ordering of the timing of data transfer from the secondary cache control unit 300 and the timing of the invalidation request accompanying the replacement control. It is conceivable, however, that the above-described timing relationship will occur regularly, depending on a change in configuration or control of the secondary cache control unit 300 caused by the multi-core configuration and so forth. In that case, unnecessary instruction re-execution occurs at every replacement process, and the degradation of the performance occurs regularly. Therefore, an information processing device which processes memory access in an out-of-order fashion may be degraded in performance.

An information processing device applied with a primary cache control and a primary cache control unit 200A according to the present embodiment, which will be described below with reference to FIGS. 1 to 4, has a configuration and function for preventing unnecessary instruction re-execution. The CPU-α or the CPU-β according to the present embodiment uses the primary cache control unit 200A (200A-a or 200A-b) in place of the above-described primary cache control unit 200.

Figure 1:
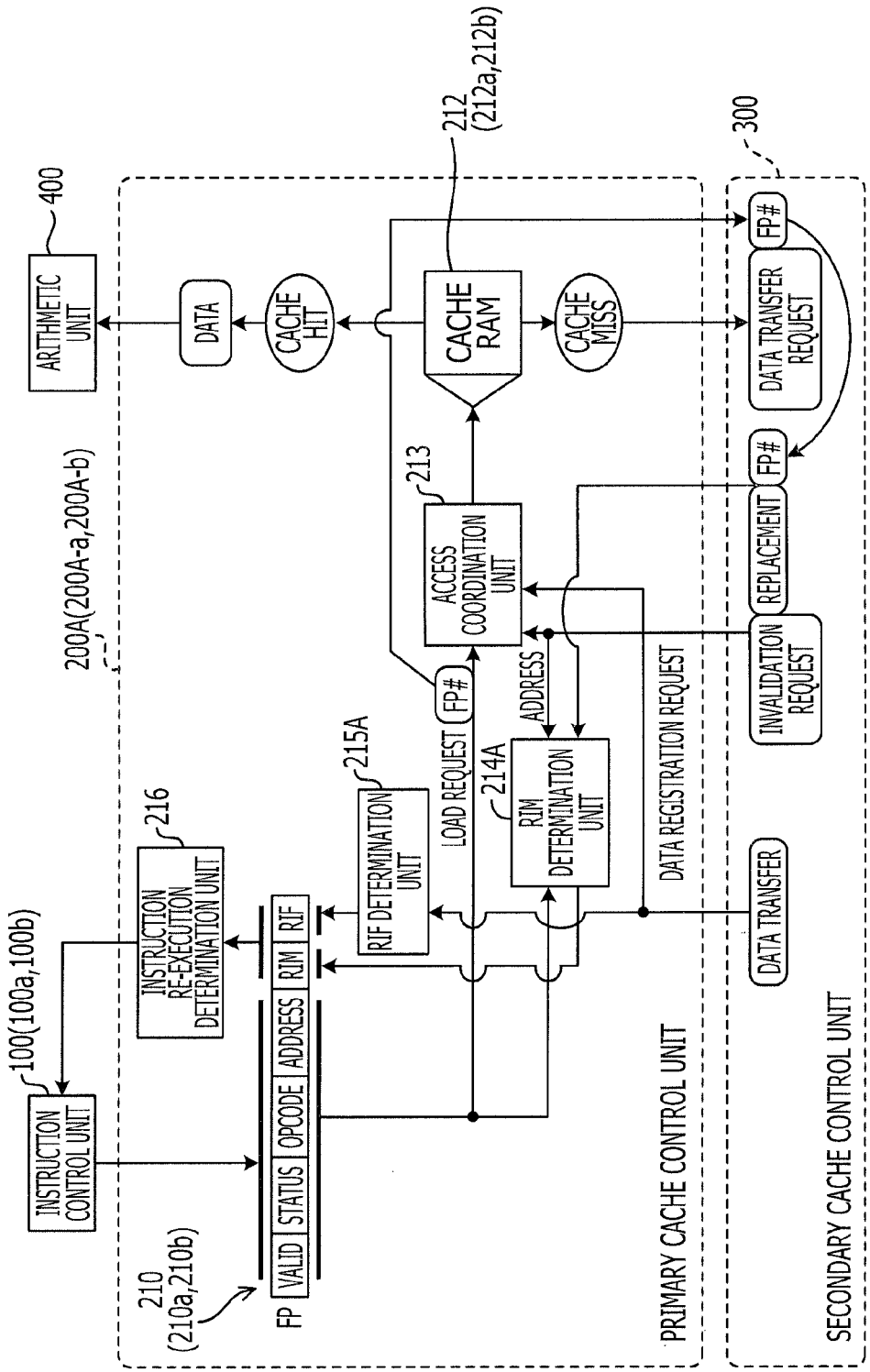
FIG. 1 is a block diagram illustrating a primary cache control unit according to an embodiment of the invention.
Figure 2:
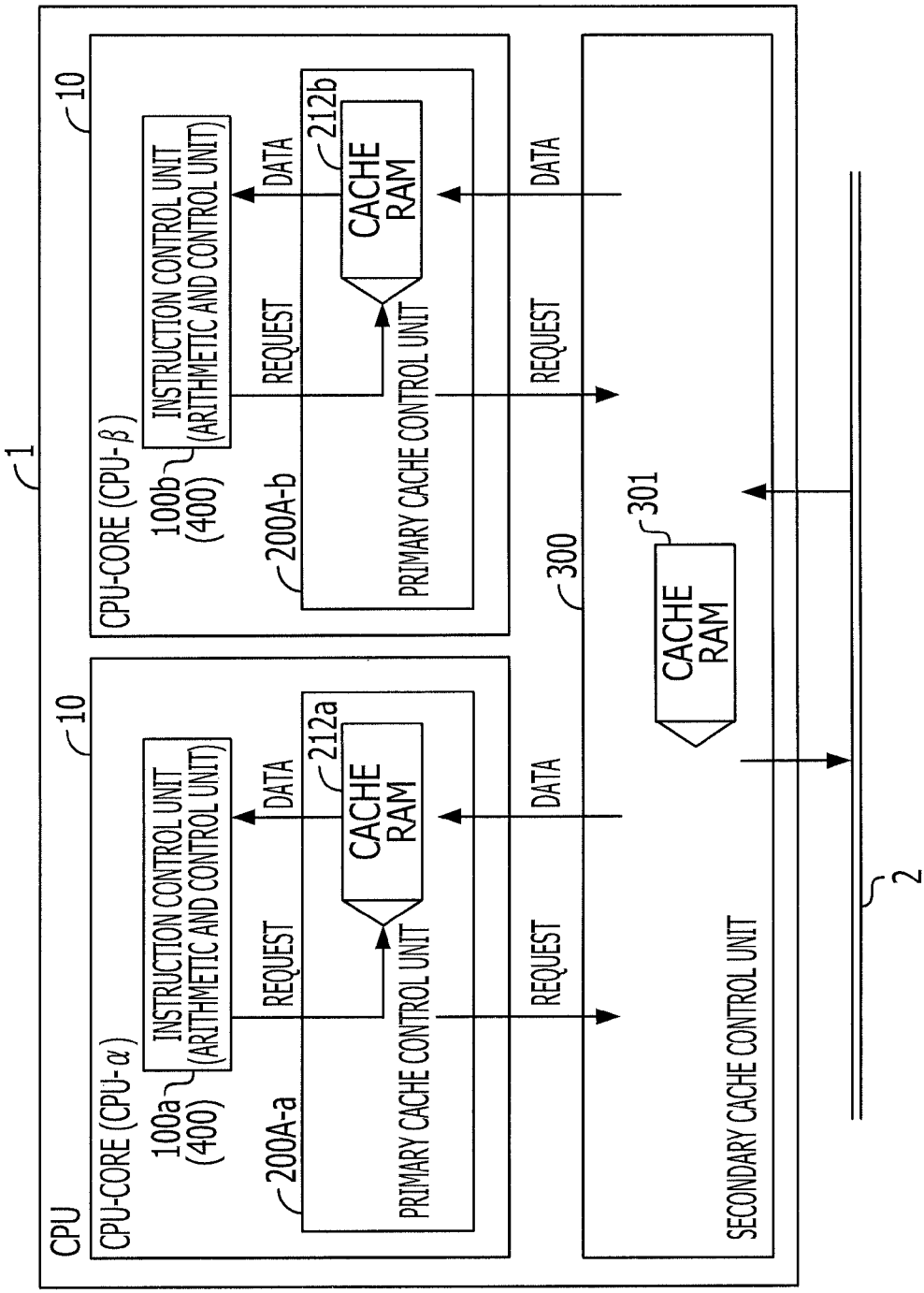
FIG. 2 is a block diagram illustrating an information processing device applied with the primary cache control unit.

FIG. 1 is a block diagram illustrating an example of the configuration of the primary cache control unit 200A (200A-a or 200A-b) according to the present embodiment. FIG. 2 is a block diagram illustrating an example of the configuration of an information processing device applied with the primary cache control unit 200A according to the present embodiment. In the drawings, the same reference numerals as the previously described reference numerals designate components the same or substantially the same as the components designated by the previously described reference numerals, and thus description thereof will be omitted. Further, in the following description, a reference numeral attached with "a" will be used to identify a component of the CPU-α, while a reference numeral attached with "b" will be used to identify a component of the CPU-β. If there is no need to identify the CPU-α or the CPU-β, a reference numeral will be represented without "a" or "b."

As illustrated in FIG. 2, a CPU 1 applied with the primary cache control unit 200A according to the present embodiment employs a multiprocessor configuration. The CPU 1 includes two CPU-COREs 10 (CPU-α and CPU-β) each serving as a processing unit. The two CPU-COREs 10 share a secondary cache control unit 300 provided in a lower layer. Further, each of the CPU-COREs 10 processes memory access in an out-of-order fashion, and includes an instruction control unit 100, an arithmetic unit 400 serving as an arithmetic and control unit, and a primary cache control unit 200A. Further, the CPU 1 (secondary cache control unit 300) is connected to a system control bus 2 to be communicably connected to a not-illustrated main memory and so forth. The individual primary cache control unit 200A includes a primary cache memory 212, and the secondary cache control unit 300 includes a secondary cache memory 301.

As illustrated in FIG. 1, the primary cache control unit 200A is configured to include an FP 210, a priority unit, a cache memory 212, an access coordination unit 213, a RIM determination unit 214A, a RIF determination unit 215A, and an instruction re-execution determination unit 216. For the sake of convenience, FIG. 1 only illustrates one entry of the FP 210, which includes a plurality of entries, and illustration of the priority unit is omitted. For the priority unit, see the priority unit 211 of FIG. 6.

When sending a data transfer request in accordance with the cache miss of a load request to the cache memory 212, the primary cache control unit 200A illustrated in FIG. 1 sends, together with the data transfer request, the FP number of the source of the data transfer request to the secondary cache control unit 300. The FP number of the request source identifies the entry of the FP 210 holding the load request.

As illustrated in FIG. 1, when issuing an invalidation request based on the replacement process in accordance with the data transfer request, the secondary cache control unit 300 according to the present embodiment notifies the primary cache control unit 200A of, together with the invalidation request, the FP number of the data transfer request source and the information indicating that the invalidation request is based on the replacement process. In the primary cache control unit 200A, the RIM determination unit 214A and the RIF determination unit 215A perform respective determination processes, which will be described later with reference to FIGS. 3 and 4, by using the information received from the secondary cache control unit 300.

The RIM determination unit 214A, the RIF determination unit 215A, and the instruction re-execution determination unit 216 of the primary cache control unit 200A illustrated in FIG. 1 exert the following functions.

The RIM determination unit 214A functions as a first determination unit which performs a condition determination as described below and validates the RIM flag as a first flag when a predetermined condition is met. The RIM determination unit 214A first performs a determination similar to the determination performed by the RIM determination unit 214 illustrated in FIG. 5. That is, if the primary cache control unit 200A receives an invalidation request for invalidating the data in the cache memory 212 during a period between a transfer of the target data of a load instruction held in an entry of the FP 210 from the cache memory 212 to the arithmetic unit 400 in accordance with the load instruction and a release of the entry, the RIM determination unit 214A determines whether or not a load instruction having a cache-index matching the cache-index of the target address of the invalidation request is present in an entry of the FP 210. In other words, it is determined whether or not an invalidation request for invalidating the data in the cache memory 212 is received during a period between a transfer of the target data of a load instruction held in an entry of the FP 210 from the cache memory 212 to the arithmetic unit 400 in accordance with the load instruction and a release of the entry. Further, it is determined whether or not a load instruction having a cache-index matching the cache-index of the target address of the invalidation request is present in an entry of the FP 210. If it is determined that such an entry is absent in the FP 210, the RIM determination unit 214A does not validate the RIM flag.

Meanwhile, if an entry meeting the above-described condition is present in the FP 210, the RIM determination unit 214A determines whether or not the invalidation request is attributed to the replacement process based on the information received from the secondary cache control unit 300. The RIM determination unit 214A further determines whether or not the entry (FP number) of the FP 210 holding the load instruction having the matched cache-index matches the entry (FP number) of the FP 210 holding a request source instruction to perform the replacement process with the use of the FP number assigned to the invalidation request. Then, if the invalidation request is not attributed to the replacement process, or if the FP numbers do not match each other, the RIM determination unit 214A validates the RIM flag of the entry. That is, if the above-described entry is present in the FP 210, the RIM determination unit 214A validates the RIM flag of the entry, except when the invalidation request is attributed to the replacement process and the FP numbers match each other. In still other words, the RIM determination unit 214A prevents the validation of the RIM flag, if the above-described entry is present in the FP 210, if the invalidation request is attributed to the replacement process, and if the FP numbers match each other.

Further, the RIF determination unit 215A functions as a second determination unit which performs a condition determination as described below and validates the RIF flag as a second flag when a predetermined condition is met. The RIF determination unit 215A first performs a determination similar to the determination performed by the RIF determination unit 215 illustrated in FIG. 5. In the event of cache miss of the target data of a load instruction held in an entry of the FP 210, the RIF determination unit 215A determines whether or not the target data has been transferred from the secondary cache control unit 300. If the target data of the load instruction has not been transferred after the cache miss of the load instruction, the RIF determination unit 215A does not validate the RIF flag.

Meanwhile, if the target data of the load instruction has been transferred from the secondary cache control unit 300 after the cache miss of the load instruction, the RIF determination unit 215A further determines whether or not an entry containing a validated RIM flag is already present in the FP 210. Then, if an entry containing a validated RIM flag is already present in the FP 210, the RIF determination unit 215A validates the RIF flag of the entry. Meanwhile, if an entry containing a validated RIM flag is absent in the FP 210, the RIF determination unit 215A prevents the validation of the RIF flag in the entry.

The instruction re-execution determination unit 216 functions similarly to the instruction re-execution determination unit 216 illustrated in FIG. 5. Upon completion of a load instruction held in an entry of the FP 210, the instruction re-execution determination unit 216 determines whether or not the RIM flag and the RIF flag are both valid. Then, if it is determined that both of the flags are valid, the instruction re-execution determination unit 216 instructs the instruction control unit 100 to re-execute instructions starting from the instruction following the load instruction.

Figure 3:
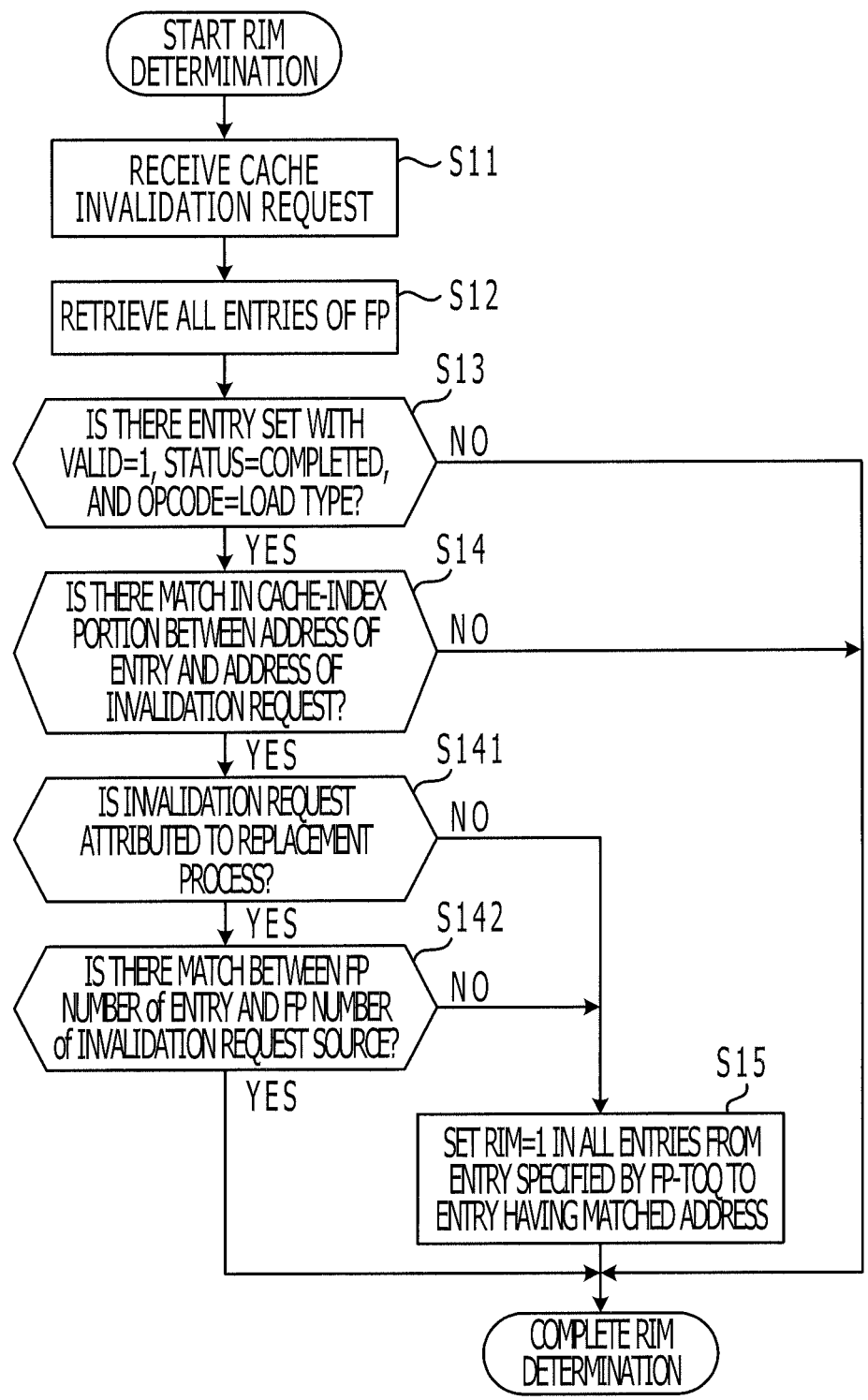
FIG. 3 is a flowchart for explaining a determination operation performed by a RIM determination unit.
Figure 4:
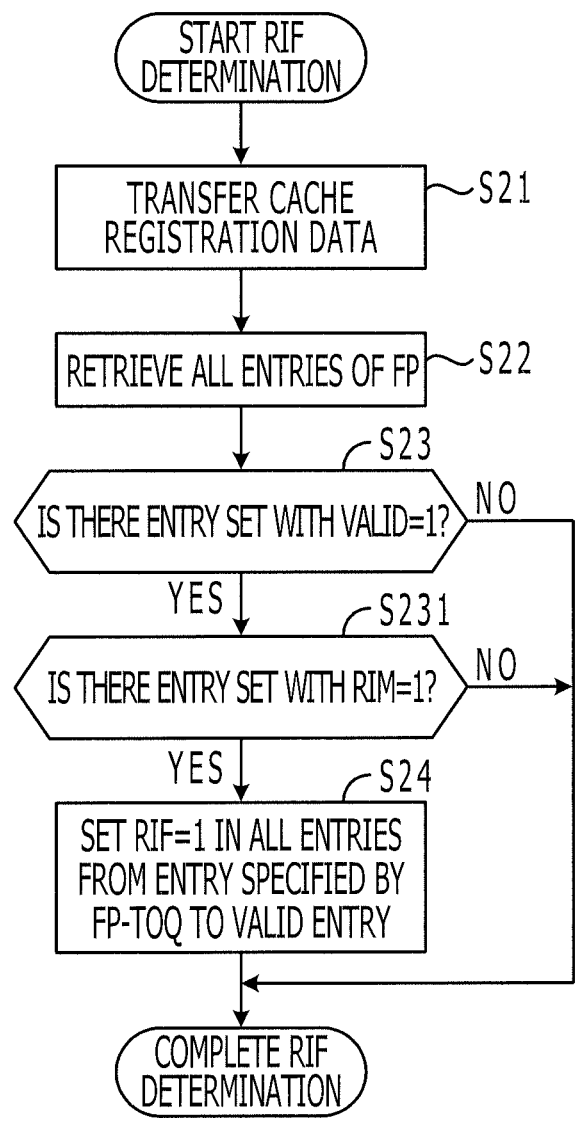
FIG. 4 is a flowchart for explaining a determination operation performed by a RIF determination unit.

The operation of the primary cache control unit 200A (200A-a or 200A-b) according to the present embodiment will be described with reference to FIGS. 3 and 4. FIG. 3 is a flowchart for explaining the determination operation performed by the RIM determination unit 214A. FIG. 4 is a flowchart for explaining the determination operation performed by the RIF determination unit 215A.

The RIM determination unit 214 illustrated in FIG. 5 validates the RIM flag, if the target address (cache-index) of the load instruction held in the FP 210 matches the target address (cache-index) of the invalidation request. Meanwhile, the RIM determination unit 214A of FIG. 1 prevents the validation of the RIM flag, if the invalidation process is exactly attributed to the replacement process accompanying the cache registration process of the load target data. Therefore, the RIM determination unit 214A prevents the generation of an unnecessary instruction re-execution request.

To prevent the issuance of an unnecessary instruction re-execution request, which has been described with reference to FIG. 14, the invalidation request from the secondary cache control unit 300 is attached with the information indicating whether or not the invalidation request is attributed to the replacement process ("REPLACEMENT" illustrated in FIG. 1). If the invalidation request is attributed to the replacement process, the invalidation request is also attached with the information representing the FP number ("FP#" illustrated in FIG. 1) of the source of the data transfer request, which has caused the generation of the invalidation request.

In FIG. 14, the existing data entirely different from the target data but the same in index as the target data (address=C, index=i) is replaced by the target data to register in the cache memory 212 the target data of the load instruction held in the entry FP #1 (address=B, index=i). In this case, the invalidation process performed on the data having the address address=C may be determined by the RIM determination unit 214 as the invalidation process performed on the target data of the load instruction in the entry FP #1. If the match between the address of the invalidation request and the address of the FP entry is determined based on all bits of the addresses, the RIM determination unit 214 which performs a determination in accordance with the procedure illustrated in FIG. 8, can determine that address B is not equal to the address C in the case described with reference to FIG. 14, and thus can prevent the issuance of an unnecessary instruction re-execution request. To realize the function with a high operating frequency or a small amount of circuit, however, it is desired to determine the match between the address of the invalidation request and the address of the FP entry only on the basis of the cache-index portion. To prevent the degradation of the performance while maintaining the above-described advantage, the RIM determination unit 214A of the present embodiment performs the determination operation in accordance with the flowchart illustrated in FIG. 3.

Upon receipt from the secondary cache control unit 300 of an invalidation request to the cache memory 212 (S11), the RIM determination unit 214A retrieves all of the entries of the FP 210 (S12). Then, the RIM determination unit 214A determines whether or not an entry set with values of "valid=1," "status=completed," and "opcode=load type" is present in the FP 210 (S13). The RIM determination unit 214A determines whether or not an invalidation request for invalidating the target data in the cache memory 212 has been received from the secondary cache control unit 300 during a period between the transfer of the target data from the cache memory 212 to the arithmetic unit 400 in accordance with a load instruction held in the FP 210, and the release of the entry.

If the above-described entry is present in the FP 210 (YES at S13), the RIM determination unit 214A determines whether or not the cache-index portion of the address of the entry matches the cache-index portion of the target address of the invalidation request received from the secondary cache control unit 300 (S14). If the cache-index portions match each other (YES at S14), the RIM determination unit 214A determines whether or not the invalidation request is attributed to the replacement process (S141). If the invalidation request is not attributed to the replacement process (NO at S141), the RIM determination unit 214A sets the RIM flag to a value of "1" in all entries from the entry specified by the FP-TOQ to the entry having the matched address (S15).

Meanwhile, if the invalidation request is attributed to the replacement process (YES at S141), the RIM determination unit 214A determines whether or not the entry (FP number) of the FP 210 holding the load instruction having the matched cache-index matches the entry (FP number) of the FP 210 holding a request source instruction to perform the replacement process (S142). If the FP numbers match each other (YES at S142), the invalidation process does not correspond to the target data of the FP entry (e.g., data with address=B in FIG. 14), even if there is a match in cache-index portion (e.g., index=i in FIG. 14) at S14. The invalidation process corresponds to, for example, the data with address=C in FIG. 14. The RIM determination unit 214A, therefore, completes the RIM determination process, without validating the RIM flag in the entry. The RIM determination unit 214A also completes the RIM determination process, if a target entry is absent in the FP 210 (NO at S13 or S14).

Meanwhile, if the FP numbers do not match each other (NO at S142), the invalidation process may correspond to the target data of the FP entry. The invalidation process may correspond to, for example, the data with address=B in FIG. 14. The RIM determination unit 214A, therefore, sets the RIM flag to a value of "1" in all entries from the entry specified by the FP-TOQ to the entry having the matched address (S15).

As described above, if the invalidation process is attributed to the replacement process, and if FP numbers of the entry holding the load instruction and the entry holding the request source instruction to perform the replacement process which own cache-index match each other also match each other, the RIM determination unit 214A prevents the validation of the RIM flag. Therefore, it is possible to prevent the issuance by the instruction re-execution determination unit 216 of an unnecessary instruction re-execution request unrelated to the prevention of the TSO violation, as in the case illustrated in FIG. 14.

The RIF determination unit 215 illustrated in FIG. 5 performs a determination in accordance with the procedure illustrated in FIG. 9, and validates the RIF flag simply when any of the entries of the FP 210 is valid. Therefore, the RIM flag can be validated after the RIF flag is validated. Meanwhile, the RIF determination unit 215A of FIG. 1 validates the RIF flag in accordance with the data transfer to the cache memory 212 based on an additional condition that a valid RIM flag is present in any of the entries of the FP 210. The RIF flag is validated if the data transfer to the cache memory 212 is performed after the validation of the RIM flag. If an entry containing a valid RIM flag is absent in the FP 210 when the data transfer to the cache memory 212 has been performed, however, the validation of the RIF flag is prevented to prevent the generation of an unnecessary instruction re-execution request.

The RIF determination unit 215A of FIG. 1 performs the determination operation in accordance with the flowchart illustrated in FIG. 4. If data to be registered into the cache memory 212 is transferred from the secondary cache control unit 300 (S21), the RIF determination unit 215A retrieves all of the entries of the FP 210 (S22). Then, the RIF determination unit 215A determines whether or not an entry set with a value of "valid=1," i.e., a valid entry is present in the FP 210 (S23). If a valid entry is present in the FP 210 (YES at S23), the RIF determination unit 215A determines whether or not an entry set with a value of "RIM=1" is present (S231). If an entry set with a value of "RIM=1" is present (YES at S231), the RIF determination unit 215A sets the RIF flag to a value of "1" in all entries from the entry specified by the FP-TOQ to the valid entry (S24). In other words, the RIF determination unit 215A validates the RIF flag, if the data transfer to the cache memory 212 is performed after the validation of the RIM flag. If a valid entry is absent in the FP 210 (NO at S23), or if an entry set with a value of "RIM=1" is absent in the FP 210 (NO at S231), the RIF determination unit 215A completes the RIF determination process.

As described above, if an entry containing a validated RIM flag is absent when the data has been transferred to the cache memory 212, the validation of the RIF flag is prevented. Therefore, it is possible to prevent the instruction re-execution determination unit 216 from issuing an unnecessary instruction re-execution request unrelated to the prevention of the TSO violation.

According to the present embodiment, it is possible to prevent the issuance of an unnecessary instruction re-execution request unrelated to the prevention of the TSO violation in the instruction re-execution process for guaranteeing the TSO performed in the CPU 1 which processes an out-of-order memory access. More specifically, if the invalidation process is attributed to the replacement process, and if FP numbers of the entry holding the load instruction and the entry holding the request source instruction to perform the replacement process which corresponding cache-index match each other also match each other, the validation of the RIM flag is prevented. Further, if an entry containing a validated RIM flag is absent when data transfer to the cache memory 212 has been performed, the validation of the RIF flag is prevented.

Accordingly, the unnecessary instruction re-execution request present in the primary cache control unit 200 illustrated in FIG. 5 is reliably prevented in the primary cache control unit 200A illustrated in FIG. 1 and so forth, and thus unnecessary instruction re-execution requests are reduced. Therefore, the guarantee of the TSO is reliably achieved without degradation of the processing performance of the CPU 1. It is therefore possible to reliably guarantee that the order of store instructions processed by a processor designated by, for example, a reference numeral 10a is reflected in load instructions executed by another processor designated by, for example, a reference numeral 10b.

Various embodiments of the invention have been described in detail above. The invention, however, is not limited to the particular embodiments, and may be implemented in various modified or altered forms within a scope not departing from the gist of the invention.

For example, in the present embodiments, description has been made of the case in which the number of processing units is two. The invention, however, is not limited thereto.

Further, all or a part of the functions of the priority unit 211, the access coordination unit 213, the RIM determination unit (first determination unit) 214A, the RIF determination unit (second determination unit) 215A, and the instruction re-execution determination unit 216 described above are realized by a predetermined application program (cache memory control program) executed by a computer.

The program is provided as recorded in a non-transitory computer-readable, recording medium, such as a flexible disk, a CD (Compact Disc) including a CD-ROM (Read-Only Memory), a CD-R (Recordable), and a CD-RW (ReWritable), a DVD (Digital Versatile Disc) including a DVD-ROM, a DVD-RAM, a DVD-R, a DVD-RW, a DVD+R, and a DVD+RW, or a Blu-ray disc, for example. In this case, the computer uses the program by reading the program from the recording medium and transferring and storing the program into an internal or external storage device.

Herein, a computer is a concept including hardware and an OS (Operating System), and refers to the hardware operating under the control of the OS. Further, if the OS is unnecessary and the hardware is operated solely by an application program, the hardware corresponds to the computer. The hardware includes at least a microprocessor such as a CPU and means for reading a computer program recorded in a recording medium. The above-described cache memory control program includes program codes for causing the above-described computer to realize the functions of the above units 211, 213, 214A, 215A, and 216. Further, a part of the functions may be realized not by the application program but by the OS.

What is claimed is:

1. An information processing device including a plurality of processing units which process an out-of-order memory access, each of the processing units comprising:
  a cache memory;
  an instruction port that holds instructions for accessing data in the cache memory in entries;
  a first validation determiner that validates a first flag when the first determination unit receives an invalidation request for invalidating data stored in the cache memory after a target data of a load instruction is transferred from the cache memory to an arithmetic unit and when it is determined that the load instruction has a cache index identical to a cache index of a target address of the received invalidating instruction and exists in the instruction port;
  a second validation determiner that validates a second flag when it is determined that the target data of the load instruction held in an entry of the instruction port has been transferred after a cache miss of the target data occurred; and
  an instruction re-execution determiner that instructs to re-execute an instruction that follows the load instruction when it is determined that the first flag and the second flag are both valid when the load instruction held in the entry of the instruction port has been completed.

2. The information processing device according to claim 1, wherein the first validation determiner prevents the validation of the first flag when the received invalidation request is attributed to a replacement process, and the entry of the instruction port that holds the load instruction in which a cache-index is identical to the cache index of a target address of the received invalidating instruction and an entry of the instruction port that holds a request source instruction to perform the replacement process are identical to each other.

3. The information processing device according to claim 1, wherein the second validation determiner validates the second flag when the target data of the load instruction held in the entry of the instruction port has been transferred after cache miss of the target data occurred, and it is determined that an entry containing the validated first flag already exists in the instruction port.

4. The information processing device according to claim 1, wherein the first flag and the second flag are held in the entries of the instruction port.

5. A cache memory control device that controls a cache memory of a processing unit that shares a secondary cache control unit provided in a lower layer with one or more other processing units and an instruction port that includes an entry for holding an access request for accessing data held in the cache memory to process an out-of-order a memory access, the cache memory control device comprising:
  a first validation determiner that validates a first flag when the first validation determiner receives an invalidation request for invalidating data stored in the cache memory after a target data of a load instruction is transferred from the cache memory to an arithmetic unit and when it is determined that the load instruction has a cache index identical to a cache index of a target address of the received invalidation request and exists in the instruction port;
  a second validation determiner that validates a second flag when it is determined that the target data of the load instruction held in an entry of the instruction port has been transferred after the target data is cache missed; and
  an instruction re-execution determiner that instructs to re-execute an instruction that follows the load instruction when it is determined that the first flag and the second flag are both valid when the load instruction held in the entry of the instruction port has been completed.

6. The cache memory control device according to claim 5, wherein the first validation determiner prevents the validation of the first flag when the received invalidation request is attributed to a replacement process, and the entry of the instruction port that holds the load instruction in which a cache-index is identical to the cache index of a target address of the received invalidating instruction and an entry of the instruction port that holds a request source instruction to perform the replacement process are identical to each other.

7. The cache memory control device according to claim 5, wherein the second validation determiner validates the second flag when the target data of the load instruction held in the entry of the instruction port has been transferred after cache miss of the target data occurred, and it is determined that an entry containing the validated first flag is already exist in the instruction port.

* * * * *

UNITED STATES PATENT AND TRADEMARK OFFICE
CERTIFICATE OF CORRECTION

PATENT NO. : 8,549,232 B2
APPLICATION NO. : 12/964199
DATED : October 1, 2013
INVENTOR(S) : Naohiro Kiyota Page 1 of 1

It is certified that error appears in the above-identified patent and that said Letters Patent is hereby corrected as shown below:

In the Claims
In Column 18, Line 16, In Claim 5, after "out-of-order" delete "a".
In Column 18, Line 50, In Claim 7, delete "is already exist" and insert -- already exists --, therefor.

Signed and Sealed this
Twenty-eighth Day of January, 2014

Michelle K. Lee
*Deputy Director of the United States Patent and Trademark Office*